United States Patent [19]

Berg

[11] Patent Number: 4,465,321

[45] Date of Patent: Aug. 14, 1984

[54] COMPRESSION LOADED COLLAPSIBLE WHEEL

[76] Inventor: Charles A. Berg, R.F.D. #1, Box 2650, Buckfield, Me. 04220

[21] Appl. No.: 419,816

[22] Filed: Sep. 20, 1982

[51] Int. Cl.³ .................... B60B 19/00; B60C 7/00; B60C 19/00

[52] U.S. Cl. ..................... 301/5 R; 301/62; 301/32; 305/7; 308/53; 308/203

[58] Field of Search ............. 301/5 R, 6 Z, 86, 87, 301/105 R, 106, 32; 305/7; 308/53, 57, 203, 204

[56] References Cited

U.S. PATENT DOCUMENTS

| | | | |
|---|---|---|---|
| 253,098 | 1/1882 | Prosser | 305/7 |
| 3,329,444 | 7/1967 | Lidov | 305/7 X |
| 3,368,822 | 2/1968 | Treiber | 301/5 R X |
| 4,045,096 | 8/1977 | Lidov | 301/5 R X |

FOREIGN PATENT DOCUMENTS

| | | | |
|---|---|---|---|
| 868403 | 2/1953 | Fed. Rep. of Germany | 301/87 |
| 110854 | 6/1944 | Sweden | 301/86 |

Primary Examiner—David A. Scherbel

Attorney, Agent, or Firm—Daniel H. Kane, Jr.

[57] ABSTRACT

Portable collapsible spokeless wheels are formed with a rotating circular wheel rim element defining a full circle and without a central axle, hub, or spokes. The wheel rim element is formed around its outer periphery with a land portion or tread portion for bearing against the ground. The wheel rim element fits within a fender rim element which defines only a portion of a circle but greater than a half circle. At least three sets of rollers or casters are distributed around the inner surface of the fender rim element for bearing against and within a groove formed around the wheel rim. The rollers or casters are complementary with the groove portion of wheel rim element and are spaced apart to define an arc greater than a half circle. The fender rim element is further provided with braces which tie the ends of the fender rim element together and constrain the wheel rim element into a circular arch for bearing the weight of a load in compression rather than in suspension or tension. The portable collapsible wheel is used in recreational and utilitarian applications such as carts, carriers, and wheelbarrows.

21 Claims, 8 Drawing Figures

COMPRESSION LOADED COLLAPSIBLE WHEEL

CROSS REFERENCE TO RELATED APPLICATION

This patent application is related to U.S. patent application Ser. No. 293,843, filed Aug. 18, 1981, entitled PORTABLE COLLAPSIBLE WHEELS, and the subject matter of said application is incorporated herein by reference.

TECHNICAL FIELD

This invention relates to a new and improved portable and collapsible wheel which bears a load in compression on the wheel rim rather than in suspension from the wheel rim.

BACKGROUND ART

In the related U.S. patent application Ser. No. 293,843, referred to above, a variety of portable and collapsible wheels are described in which a fabric-type material extends between the hub or axle of the wheel and the rim of the wheel for performing the spoke function. That is, a fabric-type material bears the weight of the load supported by the wheel in suspension from the wheel rim. The fabric-type material spoke arrangement is coupled or secured to the hub or axle of the wheel and to the rim and means are provided for tensioning the spoke material.

Such a wheel construction and arrangement is useful in providing wheel rim and tire elements which are foldable or collapsible for storage and transport in a small space for applications in camping, outdoor recreation, and field work.

OBJECTS OF THE INVENTION

It is an object of the present invention to provide a new and improved lightweight wheel with even greater portability and collapsibility by eliminating the hub or axle and spoke elements of the wheel. A feature and advantage of this arrangement is to provide a wheel which may be folded more efficiently into a smaller space for transport or storage.

Another object of the invention is to provide a collapsible and portable wheel which bears the weight of a load in compression on the wheel rim rather than in suspension from the wheel rim.

A further object of the invention is to provide wheel rim and wheel fender elements comprised of coupled segments which may be easily disassembled and which, when assembled, in combination form circular arches of great strength in compression.

DISCLOSURE OF THE INVENTION

In order to accomplish these results, the present invention contemplates providing a portable collapsible spokeless wheel having a rotating circular wheel rim element defining a full circle and formed without a central axle or hub and spokes. The wheel rim element is formed around its outer periphery with a land portion or tread portion for bearing against the ground, and a groove portion for receiving and bearing against rollers or casters.

The invention also provides a circular nonrotating fender rim element defining only a portion of a circle but greater than a half circle and preferably, for example, two thirds of a circle arc. At least three sets of rollers or casters are distributed around the inner surface of the fender rim element. The rollers or casters are complementary with the groove portion of the wheel rim element and are spaced apart around the inner periphery of the fender rim element to define an arc greater than a half circle in the plane of the fender rim element and preferably up to, for example, two thirds of a circle arc. The fender rim element is further provided with braces, generally horizontal, tying together the ends of the fender rim element and vertical strut coupled to the braces and fender rim. The wheel rim element is thereby contained within the fender rim element and the weight of a load is transferred through the fender rim element to the wheel rim element in compression.

According to the invention the wheel rim element is mountable relative to the fender rim element for bearing against the ground below and the fender rim element rollers or casters above. By this arrangement the fender rim element compresses and contains the circular wheel rim element in a circular arch under the weight of a load. A feature and advantage of this construction and arrangement is that the load is supported by the wheel rim element in compression rather than tension or suspension and the hub or axle and spoke elements of the wheel may therefore be eliminated.

In a preferred configuration of the invention, the groove portion of the wheel rim element includes side surfaces and first and second flat track surfaces formed around the inside of the base of the groove portion. A recess between the first and second flat track surfaces is provided for receiving a wheel rim element tensioning strap or cable. The fender rim element rollers or casters comprise first and second adjacent rollers or casters complementary with the first and second flat track surfaces formed around the inside of the groove of the wheel rim element.

The fender rim element may be provided with a protruding ridge portion extending around its inner periphery provided with friction bearing pads for bearing against the sides of the groove portion of the wheel rim element and for centrally spacing the fender rim element ridge within the groove.

According to another feature of the invention the wheel rim comprises a circular arch of adjacent complementary polyhedral elements or segments such as trapezoidal shaped segments. These polyhedral segments may be hinged together at their outer surfaces for collapsing or folding and for assembling under compression with a tensioning strap to form a circular arch which supports a load under compression from the fender rim element. The polyhedral elements or segments may also be formed with complementary interfitting abutting side faces for assembly and disassembly.

Not only the wheel rim itself, but also the fender rim element may also be formed as a circular arch of adjacent complementary polyhedral elements or segments such as the trapezoidal shaped segments. These polyhedral elements are joined together in compression by the braces and struts and may be hinged together or be formed with interfitting abutting faces in the same manner as the wheel rim element.

According to the preferred form of the invention, the fender rim element forms greater than a half circle arc and up to, for example, two thirds of a circle arc with the rollers or casters distributed around the inner periphery for compressing the wheel rim and supporting a load placed on the fender rim element in compression against the wheel rim element.

While it is generally contemplated that the wheel rim element is in the form of a circular hoop of a single piece or of articulated or interfitting polyhedral segments, the wheel rim element may also be in the form of a disk of articulated or interfitting radial segments.

The invention is applicable for a variety of uses particularly recreational and field uses such as carts, carriers and wheelbarrows where lightweight collapsible wheels afford portability and convenience.

Other objects, features and advantages of the present invention will become apparent in the following specification and accompanying drawings.

BRIEF DESCRIPTION OF THE DRAWINGS

FIG. 2 is a cross sectional view through the adjacent wheel rim element and fender rim element while

FIG. 4 is a diagramatic plan view of a forked handle according to the present invention for converting the collapsible wheel to a wheelbarrow or cart, while

FIG. 5 is a diagramatic plan view of the side of a segmented circular wheel rim arch according to the present invention while

DETAILED DESCRIPTION OF THE PREFERRED EXAMPLE EMBODIMENTS AND BEST MODE OF THE INVENTION

Figure 1:
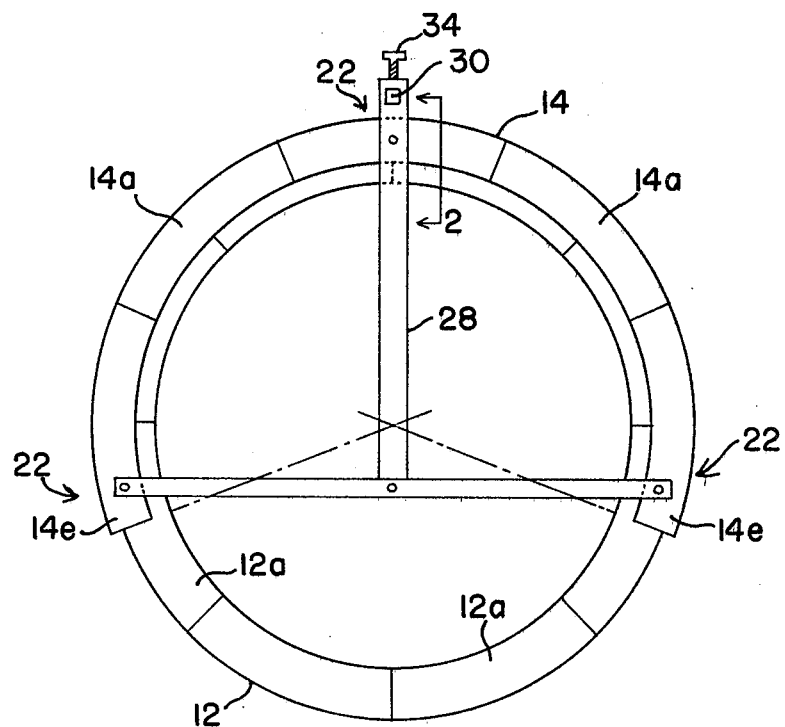
FIG. 1 is a diagrammatic side view of the portable collapsible spokeless wheel according to the present invention.

A portable collapsible spokeless wheel according to the invention is illustrated in FIG. 1. The wheel includes a rotating circular wheel rim element 12 contained within a non-rotating fender rim element 14. While the wheel rim 12 comprises a full circle for rolling over the ground, the fender rim 14 comprises only a portion of a circle greater than half circle and in this instance approximately two-thirds of a circle arc.

Figure 2:
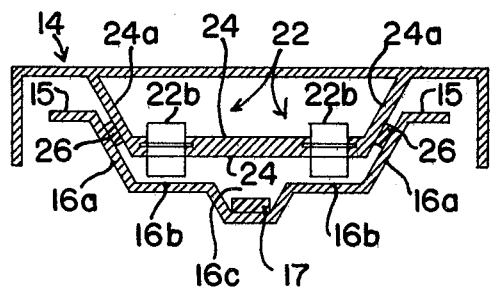
Figure 2A:
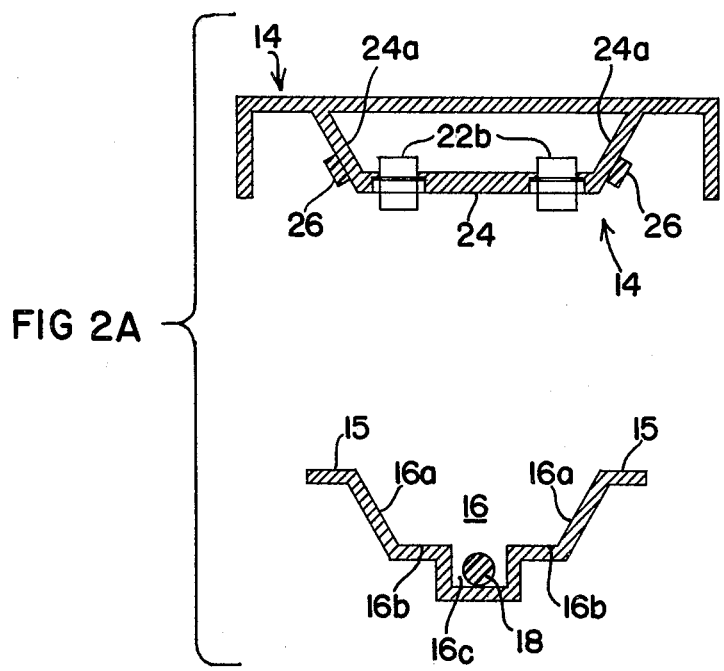
FIG. 2A is an exploded view showing the separated wheel rim element and fender rim element.

As shown in more detail in FIGS. 2 and 2A the full circle wheel rim 12 is formed around its outer periphery with a land portion or tread portion 15 for bearing against the ground and a groove portion 16 for receiving and bearing against rollers or casters mounted in the fender rim element as hereafter described.

The groove portion 16 of the wheel rim includes side surfaces 16a and first and second flat track surfaces 16b formed around the inside of the base of the groove portion. A recess 16c between the first and second flat track surfaces 16b is provided for receiving a tensioning strap 17 as shown in FIG. 2 or tensioning cable 18 as shown in FIG. 2A. The strap 17 or cable 18 serves to constrain the wheel rim element in a circular arc configuration as the wheel rim may be formed by abutting segments 12a as hereafter described.

The fender rim element 14 is provided with at least three sets 22 of rollers or casters 22b distributed around the inner surface 24 of the fender rim 14. The rollers or casters 22b are located at positions on either side of the inner surface 24 complementary with the groove portion tracks 16b of the wheel rim. The sets 22 of casters are distributed or spaced apart around the inner periphery of fender rim element 14 to define an arc greater than a half circle in the plane of the fender rim element. In the example of FIG. 1, at least three sets 22 of casters or rollers 22b encompass approximately two-thirds of a circle arc.

The fender rim 14 includes protruding ridge portions or side walls 24a constructed and arranged in a parallel complementary relationship with the side walls 16a of the wheel rim 12. The side walls 24a of the fender rim 14 are provided with friction bearing pads 26 for bearing against the inner services of the sides 16a of the groove portion 16 of the wheel rim 12. The friction bearing pads 26 serve to space the fender rim element 14 centrally within the groove 16 of the wheel rim 12.

Figure 3:
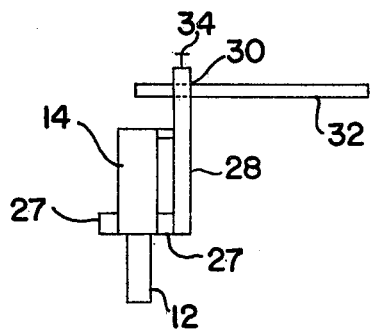
FIG. 3 is a diagramatic plan view from the front of a fender rim element according to the present invention with a mounted cross piece for supporting a load and for containing the fender and wheel in the configuration of a circular arch.

The fender rim element 14 which defines, for example, two-thirds of a circle arc is tied together on either side by horizontal braces 27, and a vertical strut 28 on at least one side connecting at least one brace 27 to the center top of the fender rim 14. The vertical strut 28 includes a portion extending above the top of the wheel rim and fender rim provided with a socket 30 for receiving and supporting a load bearing member or cross piece 32 as shown in FIG. 3. A set screw 34 or equivalent means may be provided for fixing the load bearing cross piece in position over the wheel.

According to the configuration illustrated in the example of FIGS. 1 through 3, the fender rim element 14 compresses and contains the circular wheel rim element 12 in a circular arch under the weight of the load. A load, for example, borne by cross piece 32 is transferred through the fender rim 14 and fender rim casters or rollers and is supported by the wheel rim 12 in compression rather than tension or suspension. Because the wheel rim functions as a circular arch in supporting the load and is constrained to maintain the circular configuration by the greater than half circle arc of the fender rim, a hub or axle and spoke elements for the wheel rim are unnecessary and are, therefore, eliminated.

As hereafter more fully described the fender rim 14 may be comprised of articulated and abutting polyhedral elements or segments 14a in the same manner that the wheel rim 12 may also be composed of abutting segments 12a. Another feature of the fender rim 14 is the provision of "muckrackers" or mudguards attached to the ends 14e of the fender rim 14 and extending into the groove 16 of the wheel rim 12 for scraping off mud and dirt as the wheel rotates to prevent accumulation of material between the wheel rim and fender rim which might interfere in the free rotation of the wheel. Furthermore, additional sets 22 of rollers or casters 22b may be distributed around the fender rim 14 as may be required to support the load for which the portable collapsible wheels are used.

Figure 5:
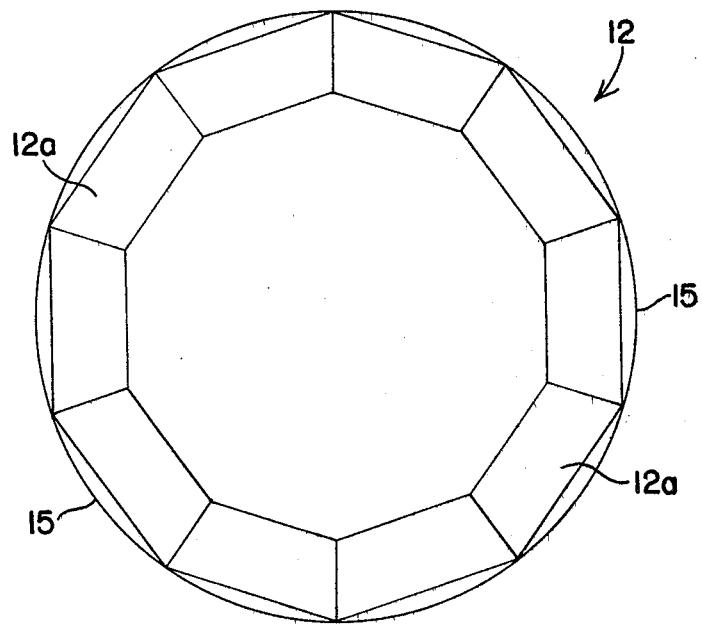
Figure 5A:
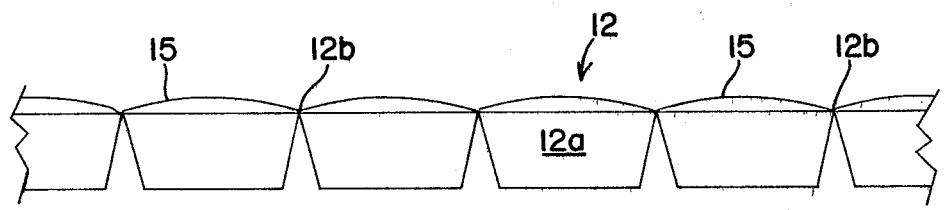
FIG. 5A is a side view of a fragmentary section of the segmented wheel rim arch in collapsed form.

One arrangement for a circular arch wheel rim of adjacent complementary polyhedral elements or segments 12a is illustrated in FIGS. 5 and 5A. In this example the polyhedral segments 12a of wheel rim 12 are of generally trapezoidal shape. The land or tread portion 15 for bearing against the road surface may be curved to afford a smooth circular bearing surface in combination for smoother travel by the wheel. The polyhedral segments 12a are articulated together at their outer surfaces by hinges 12b for collapsing the wheel into a straight line as shown in FIG. 5A and for forming a circular arch as shown in FIG. 5 using a tensioning strap or cable as shown in FIGS. 2 and 2A. The polyhedral elements or segments 12a may also be formed with complementary interfitting abutting side faces for tight fitting assembly and disassembly. The fender rim element 14 may also be formed as a circular arch of adjacent complementary polyhedral or polygonal elements or segments in the same manner as shown in FIGS. 5 and 5A.

While the wheel rim example illustrated in FIGS. 1 through 3 and 5 is comprised of articulated or interfitting polyhedral or polygonal segments, the wheel rim may also be constructed in the form of a single piece circular hoop or in the form of a single piece disc or a collapsible disc of articulated or interfitting radial segments.

Figure 4:
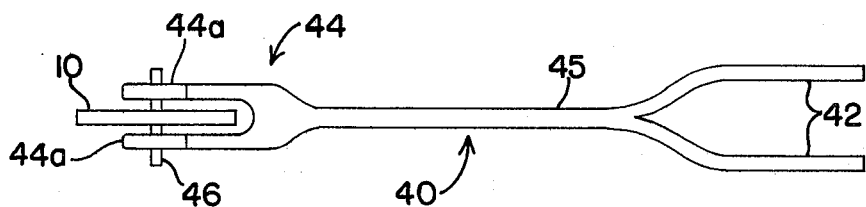
Figure 4A:
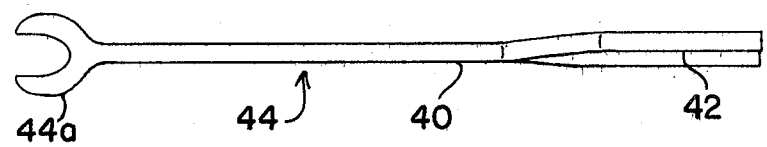
FIG. 4A is a side view.

For application of the invention to carts, carriers and wheelbarrows where lightweight collapsible wheels are desirable for portability and convenience, a fork framework or handle bar of the type illustrated in FIG. 4 may be used. This handle frame 40 is actually a double fork handle bar framework with forks 42 and 44 on either end of the bar 45. The plane of fork element 42 is arranged at right angles to the plane of fork element 44. By this arrangement, the fork element 44 can engagea wheel 10 at a stiff rod 46 passing through the braces or struts by means of "U" rests 44a at the end of each tine of fork element 44. The fork element 42 at the other end of the bar 45 provides a handle bar for engaging and controlling a cart by hand. Because the fork elements 42 and 44 actually lie in planes at respectively right angles, a side view of the fork handle frame work 40 would actually appear as shown in FIG. 4A with the "U" shaped rests 44a visible at the end of fork element 44.

While the invention has been described with reference to particular example embodiments, it is intended to cover all modifications and equivalents within the scope of the following claims.

I claim:

1. A portable collapsible spokeless wheel comprising:
   a rotating circular wheel rim element defining a full circle and formed without central axle and spokes, said wheel rim element formed around its outer periphery with a land portion for bearing against the ground and a groove portion for bearing against roller means;
   a circular nonrotating fender rim element defining only a portion of a circle but greater than a half circle, said fender rim element having mounted therein at least three roller means complementary with the groove portion of the wheel rim element, said roller means spaced from each other around the inner periphery of the fender rim element to define an arc greater than a half circle in the plane of the fender rim element, said fender rim element further comprising brace means tying together the ends of the fender rim element;
   said wheel rim element mountable within the fender rim element for bearing against the ground below and against the fender rim element roller means above, said fender rim element thereby compressing and supporting the circular wheel rim element in a circular arch under the weight of a load.

2. The wheel of claim 1 wherein the groove portion of the wheel rim element comprises side surfaces and first and second flat track surfaces formed around the inside of the base of the groove portion, said base of the groove portion further comprising a recess between the first and second flat track surfaces for receiving a wheel rim element tensioning strap or cable.

3. The wheel of claim 2 wherein at least three roller means of the fender rim element each comprise first and second castor means complementary with the first and second flat track surfaces formed around the inside of the groove portion of the wheel rim element.

4. The wheel of claim 1 wherein the fender rim element is provided with friction bearing means for bearing against the sides of the groove portion of the wheel rim element and for centrally spacing the fender rim element therein.

5. The wheel of claim 1 further comprising tensioning cable or strap means mounted within the groove portion of the wheel rim element.

6. The wheel of claim 1 wherein is further provided strut means coupled at right angles to and centrally of the brace means, said strut means further coupled to the center of the arc defined by the fender rim element.

7. The wheel of claim 6 wherein is further provided handle means comprising a handlebar with fork means extending from each end, said fork means comprising fork elements spaced in a plane, the fork element plane on one side of the handle arm being at right angles to the fork element at the other end of said handle arm and wherein said strut means is provided with means for engaging the fork elements at one end of the handle arm for providing a hand controlled wheel.

8. The wheel of claim 1 wherein the fender rim element further comprises mud guard means mounted at each end of said fender rim element and constructed and arranged for abutting against the surface of the wheel rim element.

9. The wheel of claim 1 wherein said wheel rim element comprises segmented rim means of a plurality of articulated substantially trapezoidal abutting rim segments flexibly joined in sequence at the radially outer edges and separable at the radially inner edges whereby said segmented rim means may be folded and compressed into a circular arch or opened into a substantially linear sequence for packing and storage, said rim segments formed with the peripheral land portion and groove portion of the wheel rim element to form in combination the ground bearing portion and groove portion when the circular arch is assembled.

10. The wheel of claim 1 wherein said wheel rim element comprises a circular arch of adjacent complementary polyhedral segments.

11. The wheel of claim 10 wherein said polyhedral segments are formed along each side with interfitting face means for joining the abutting polyhedral segments at said interfitting faces.

12. The wheel of claim 10 wherein said polyhedral segment are hinged together at their outer surfaces for collapsing or folding.

13. The wheel of claim 1 wherein said fender rim element comprises a segmented fender rim of a plurality of articulated substantially trapezoidal abutting fender segments flexibly joined in sequence at the radially outer edges and separable at the radially inner edges whereby said fender segments may be folded and compressed into a circular arc being said portion of a circle, or opened into a substantially linear sequence for packing or storage, said fender segments forming in combination a supporting arc for the circular wheel rim element.

14. The wheel of claim 1 wherein said fender rim element comprises a circular arch of adjacent complementary polyhedral elements.

15. The wheel of claim 14 wherein said polyhedral elements are hinged together at their outer surfaces for collapsing or folding.

16. The wheel of claim 14 wherein said polyhedral elements comprise complementary interfitting abutting side faces.

17. The wheel of claim 1 wherein said land portion of the wheel rim element comprises tread means forming a continuous tread around the periphery of the wheel rim element for bearing against the ground.

18. A portable collapsible wheel having a rotating wheel element and nonrotating fender mounting element comprising:
   circular rotating wheel rim means comprising a full circle and formed around its outer periphery with a running surface portion for contacting the ground and a groove portion for bearing against roller means;
   circular nonrotating fender rim means comprising only a portion of a circle but greater than a half circle arc, said fender rim means provided with at least three roller means complementary with the groove portion of the wheel rim means, said at least three roller means spaced apart around the inside of the fender rim means to define a supporting arc greater than a half circle in a common plane, said fender rim means further comprising brace means tying together the ends of the fender rim means.

19. The wheel of claim 18 wherein the wheel rim means comprises a circular arch of adjacent complementary polyhedral segments.

20. The wheel of claim 19 wherein said polyhedral segment are hinged together at their outer surfaces for collapsing or folding.

21. The wheel of claim 19 wherein said polyhedral segment comprise complementary interfitting abutting side faces.

* * * * *